United States Patent Office 2,898,816
Patented Aug. 11, 1959

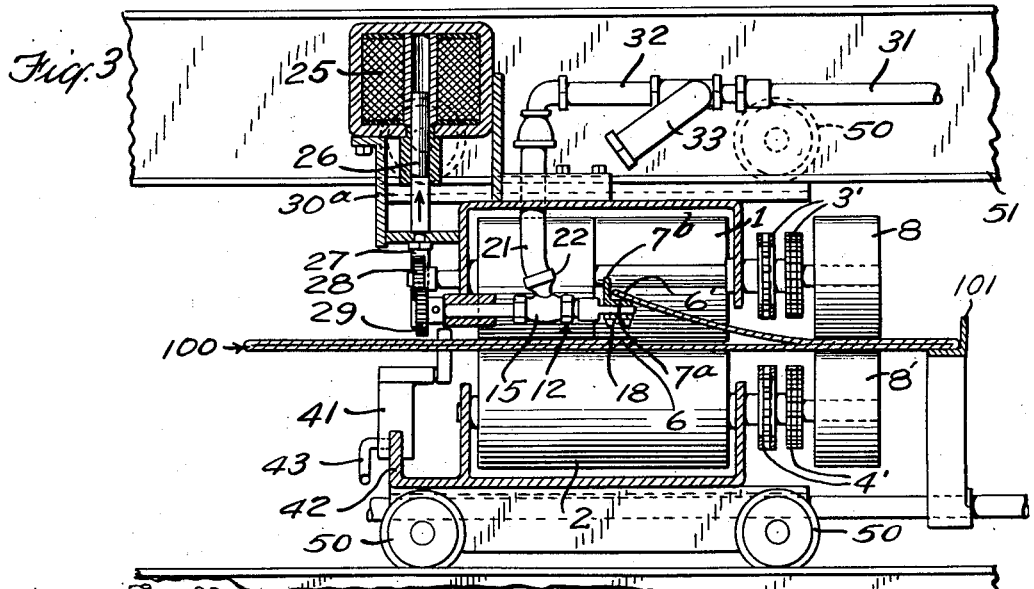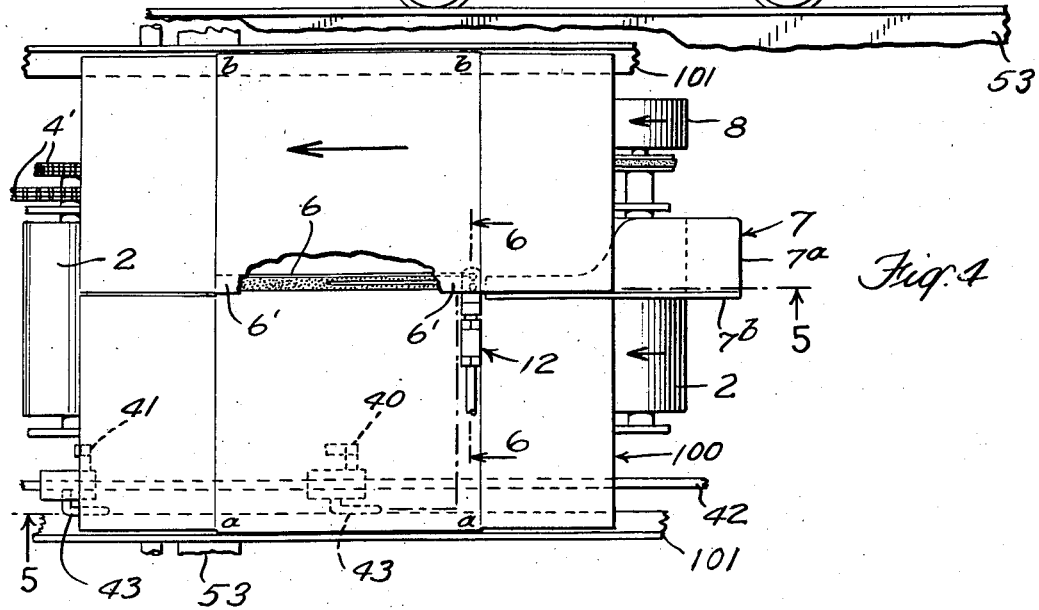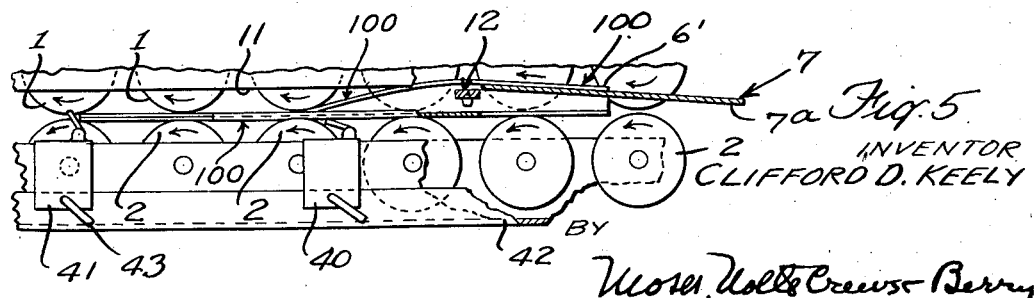

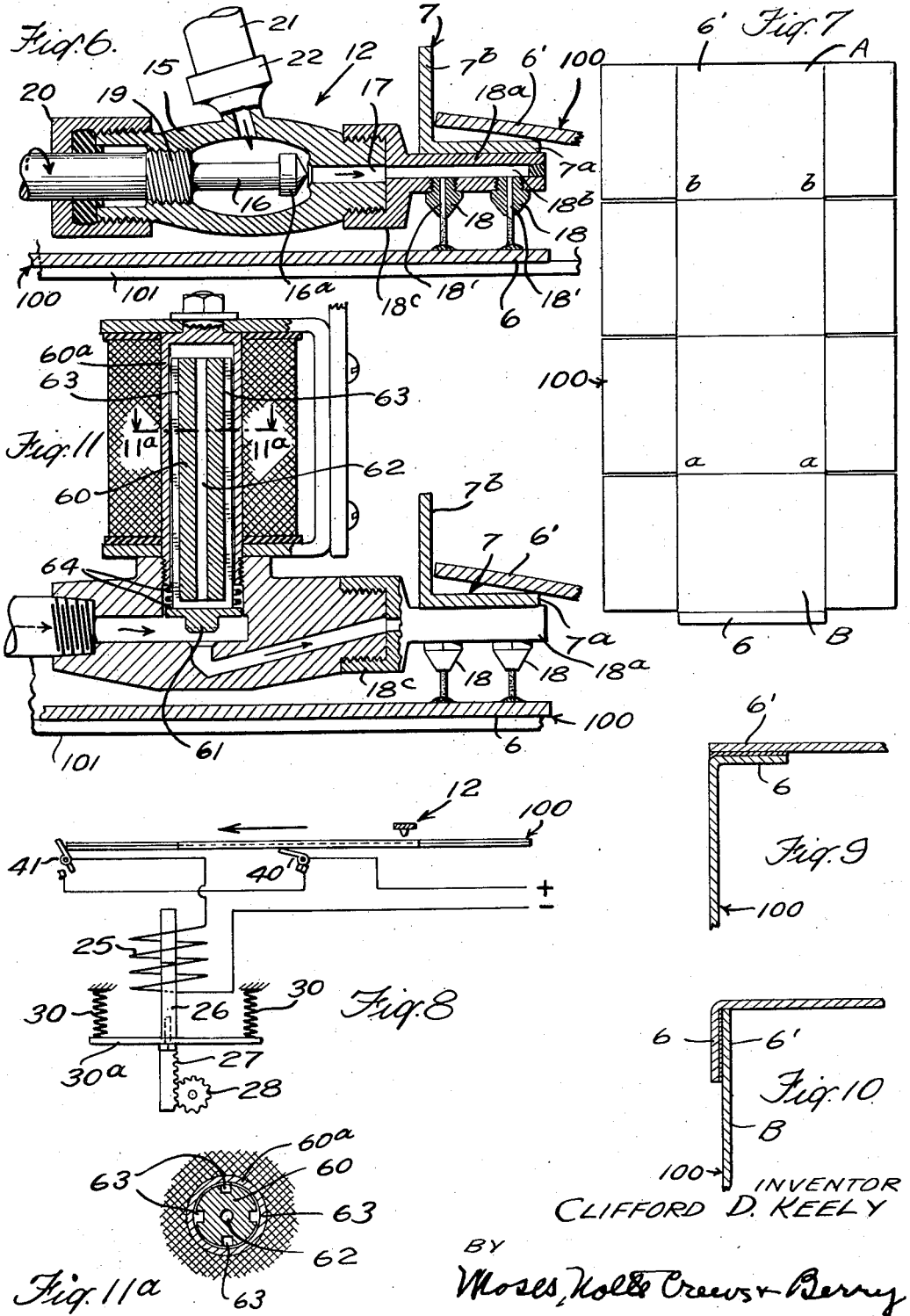

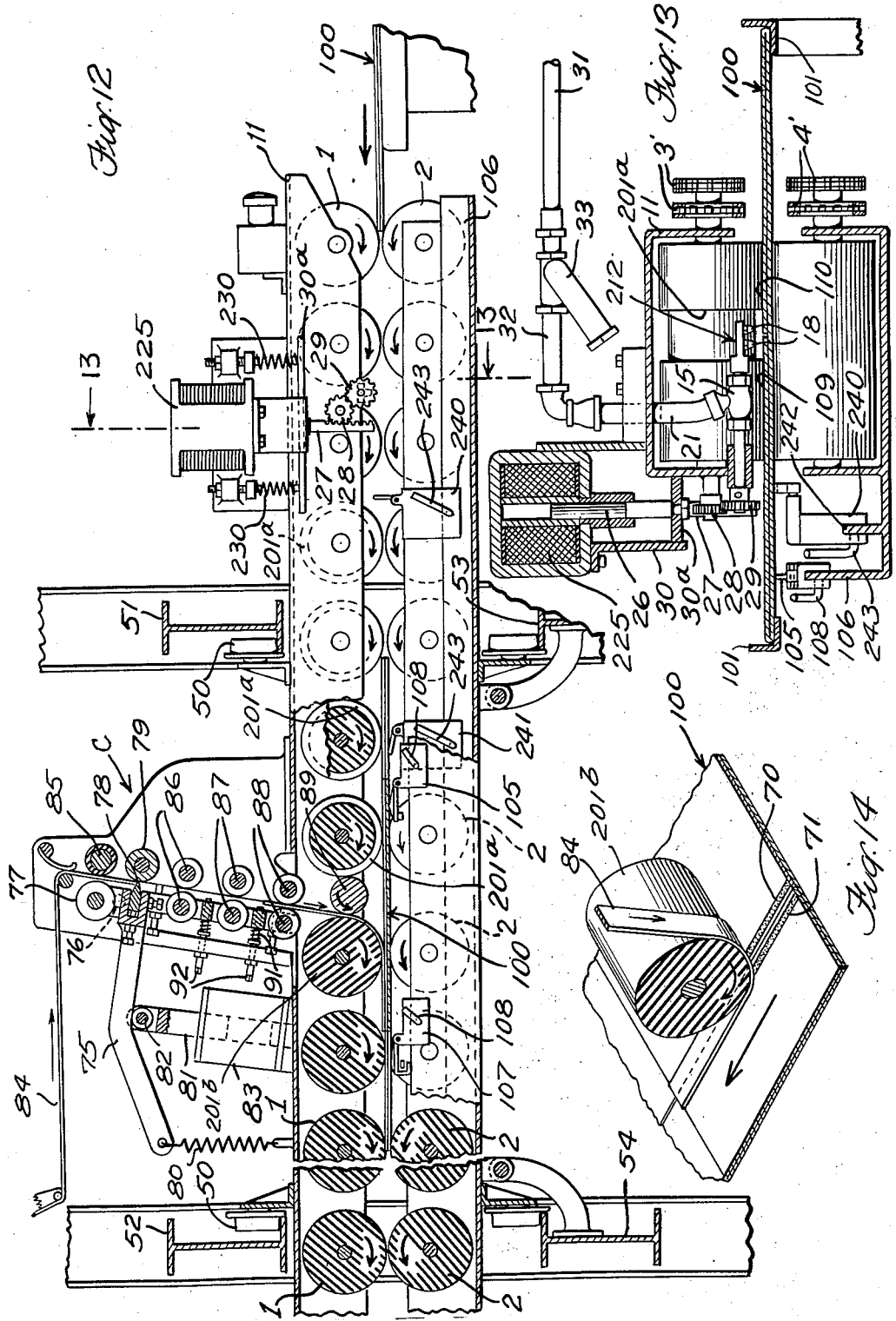

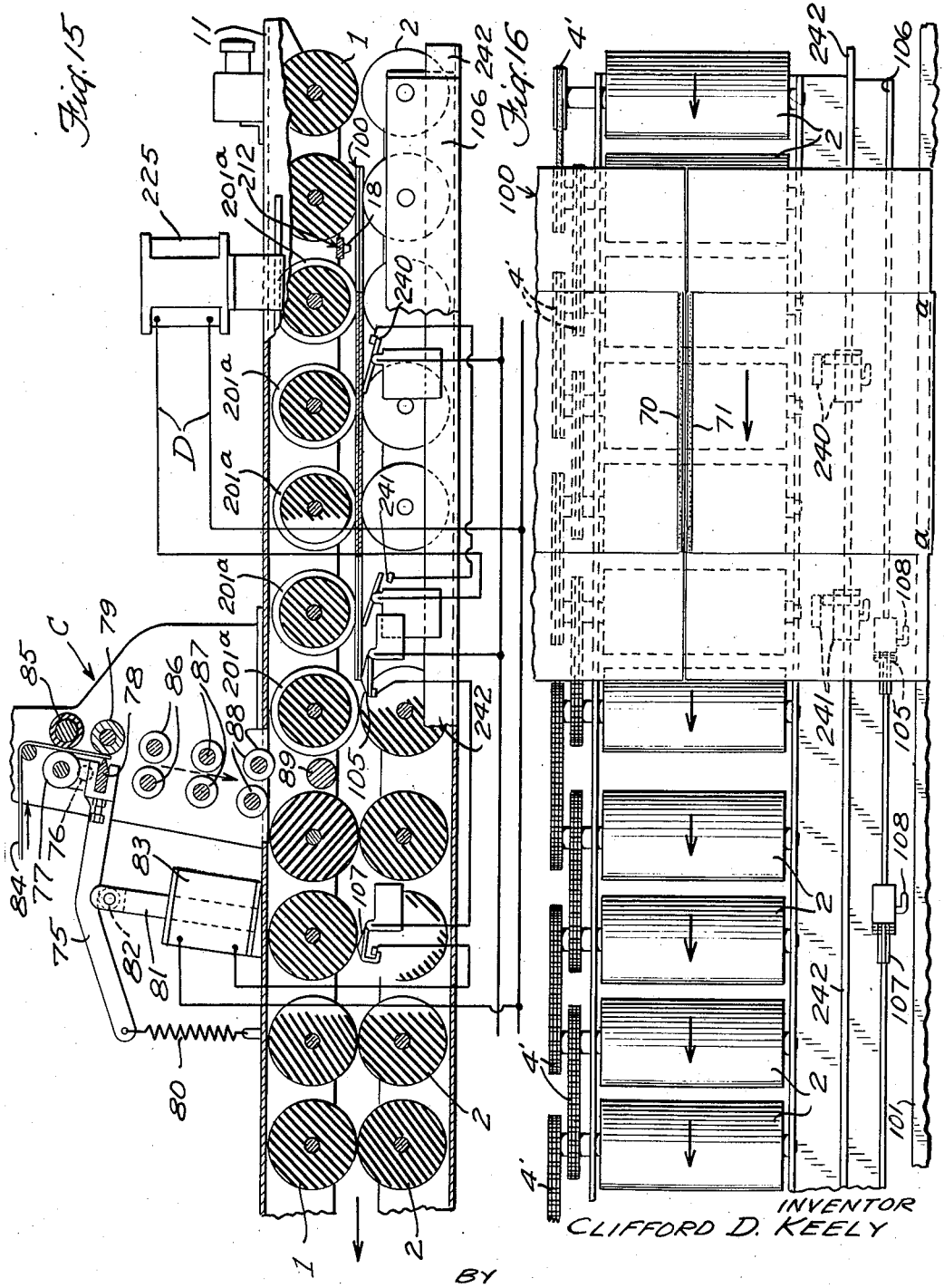

2,898,816

MACHINE FOR ADHESIVELY JOINING TWO SURFACES

Clifford D. Keely, West Englewood, N.J., assignor of one-half to Raymond J. Baisley, Hempstead, N.Y.

Application February 19, 1953, Serial No. 337,708

4 Claims. (Cl. 93—36)

My present invention relates to a machine for adhesively joining together two surfaces, and more especially those which it is necessary to unite in the manufacture of knocked down or collapsed paper board cartons. This union is commonly and herein termed a manufacturer's joint. In such manufacture it is common to feed a succession of folded box blanks into a machine, referred to in the art as a taper, in order to unite by means of a strip of pre-gummed tape, moistened and cut to length in the machine and applied to the abutting panels which, when the box is erected, constitute the sides of a corner thereof. A drawback in the use of pre-gummed tape is that it is necessary to use adhesives which are at all times water-soluble. The attempt to use waterproof or highly water resisting adhesives by applying them in the machine to plain or ungummed tape is beset with many problems. Thus such as adhesive upon drying will no longer be taken up in water, with the result that machine parts such as exposed glue rolls, etc., which come into contact with such adhesive become coated with a hardened layer thereof which is impossible to remove in the usual washing operation, thus causing excessive machine stoppages. It therefore has been common practice to employ stitching machines to staple or wire stitch a panel corner lap to the adjacent panel to which it is to be joined. The part of the panel that overlaps is commonly referred to as a "stitch lap." The "stitcher," as will be readily understood, is a mechanically complicated and expensive machine.

It is an object of my present invention to overcome these various drawbacks by providing an improved machine for adhesively uniting one box surface to another by means of one or more lines or stripes of deposited adhesive which may be of the water-resistant type, such stripes being predetermined as to number, width and location, and thereafter bringing together the surfaces to be united.

It is a further object to provide such a machine in which the adhesive stripe is deposited upon one of two overlapping box panels which are first separated and, after the deposition of the adhesive, brought together to effect union thereof.

A still further object is to provide such a machine in which adhesive stripes will be deposited along the margins of abutting box panels or elsewhere as desired, after which strips of ungummed tape previously measured to a length to correspond to the length of adhesive stripe deposited are cut and applied to the freshly gummed surfaces, thereby uniting the panels.

Thereby the adhesive used may be of any variety provided it is a flowable liquid to start with. Because of the absence of any parts performing a daubing action and since in my improved machine adhesive does not stick to the jets from which it is expressed, there are no exposed mechanical parts upon which the adhesive may accumulate.

Heretofore, attempts in this art to utilize deposited adhesive for the purpose have resulted in failure largely because of inability to control the deposition of the stripe or stripes with sufficient definition and accuracy. It is therefore likewise an object to so contrive the improved mechanism that the starting and stopping of the adhesive flow will be precisely determined and no drip of adhesive will occur when the flow is turned off.

A still further object is to provide an improved valve for operating the jets which emit the liquid adhesive.

A still further object is to provide means for maintaining the course of the moving box blank without appreciable deviation of its squareness of folded panel relationship during the time one panel is raised up and adhesive applied to the surface below the raised panel.

Other objects of my invention will be apparent as the description proceeds, and the features of novelty will be pointed out in the claims.

My invention will be best understood by reference to the following detailed description taken with the annexed drawings in which:

Fig. 3 is an enlarged vertical sectional view on line 3—3 of Fig. 1;

Fig. 4 is a fragmentary plan view showing the action of the traveling box blank in tripping the switches controlling the glue-applying mechanism;

Fig 5 is a view taken on line 5—5 of Fig. 4;

Fig. 6 is an enlarged view in section on line 6—6 of Fig. 4, showing one form of valve and associated jets for depositing a controlled quantity of adhesive upon the blanks;

Fig. 7 is a view in reduced scale of the blank prior to folding it along its median transverse axes.

Fig. 8 is a simplified diagrammatic showing of an electrical circuit employed;

Fig. 9 is a sectional view of a set-up corner of the box formed from a glued blank known as inside lap;

Fig. 10 is similar to Fig. 9 but showing the adhesive applied to the opposite member known as outside lap;

Fig. 11 is a view in longitudinal vertical section of a modified valve and associated jets for applying a controlled quantity of adhesive;

Fig. 11a is a view in section on line 11a—11a of Fig. 11;

Fig. 12 is a side elevation with parts in section of a modification adapted to utilize ungummed tape;

Fig. 13 is a view on an enlarged scale in section taken on line 13—13 of Fig. 12;

Fig. 14 is a fragmentary view in perspective showing the application of the tape to the freshly gummed surfaces;

Fig. 15 is a view similar to Fig. 12 showing in diagrammatic manner the control circuits used; and Fig. 16 is a plan view of the machine shown in Fig. 15.

Figure 1:
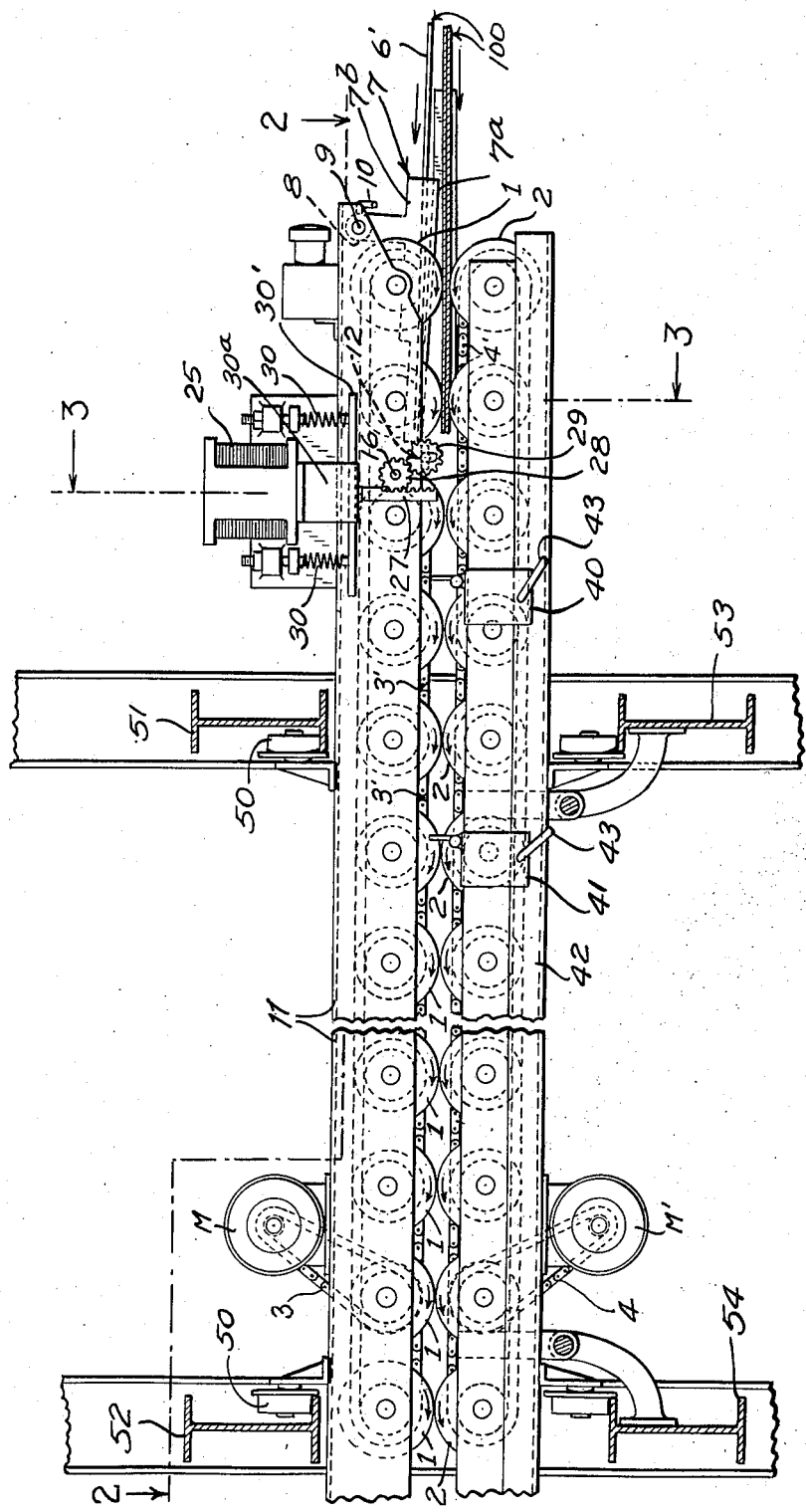
Figure 1 is a side elevational view of a preferred embodiment with parts in section taken on line 1—1 of Fig. 2.

Fig. 1 shows a view of the improved machine which so far as the blank conveying and holding elements are concerned is altogether similar to that of my prior application Serial No. 157,216, filed April 21, 1950, in which machine the blanks had applied thereto a pregummed and machine-moistened tape. In the present machine the blanks are similarly conveyed therethrough by means of upper feed rolls 1 and lower feed rolls 2, said rolls being preferably independently driven by means of synchronous motors M and M' respectively. Motor M, Fig. 1, is thus shown connected to the upper conveying rolls through a sprocket chain 3 whereas motor M' has associated therewith sprocket chain 4, the rolls being interconnected by sprockets and upper and lower chains 3' and 4' as already described in my prior application mentioned and shown in Fig. 2 of this specification.

Figure 2:
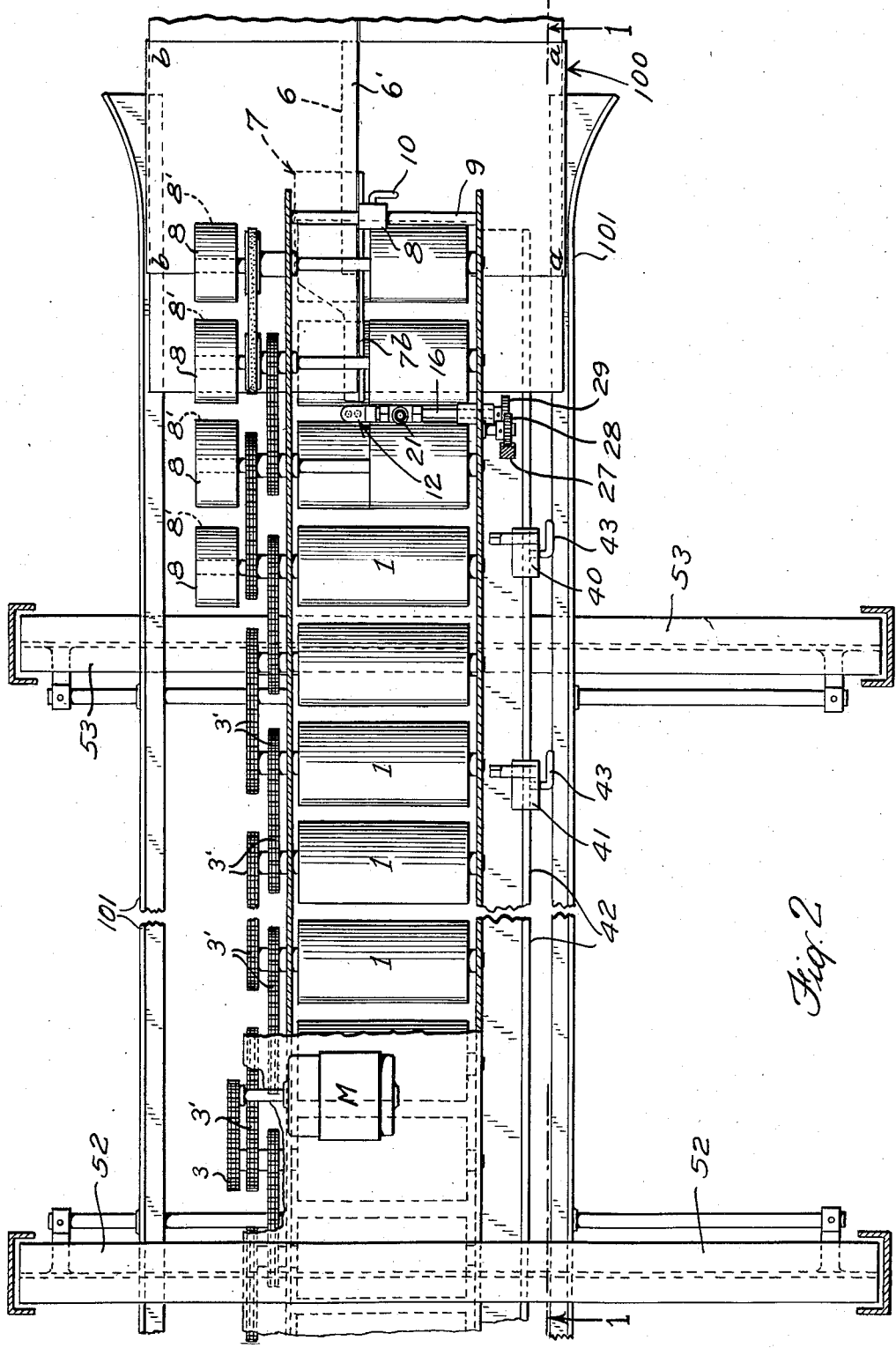
Fig. 2 is a sectional view on line 2—2 of Fig. 1.

Fig. 7 shows a typical blank which is provided with what may be termed a glue lap 6. Prior to feeding it into the machine, the blank is folded along the previously scored fold lines a—a, b—b, the so folded blank also being seen in Fig. 4. When the operator has folded the blank as indicated and such blank is engaged by the intial opposed feed rolls 1, 2, constituting respectively upper and lower conveying runs, continued feed of the blank in the machine causes the overlapping flap 6', for example, to be held up by means of a raised-level deflector 7 carried by a bracket 8 laterally movable on a bar 9 and held in adjusted position thereon by means of a set screw 10, Fig. 1. Further, the deflector 7 has an upstanding guide portion 7b, Fig. 6, against which the edge of the blank panel may abut. Bar 9 is secured in the frame 11 for the conveying rolls 1. To accommodate the deflector 7 and associated parts and to permit the raising up of one of the flaps to be glued, the first three or more of the upper rolls 1 are cut away as indicated in Fig. 2, according to which such upper rolls 1 may extend only about half the distance of the lower rolls. Also the shafts of said upper rolls are extended as shown in Figs. 2 and 3 and carry auxiliary rolls 8, to match with the shafts of the lower rolls which are likewise extended and bear thereon rolls 8' in vertical alignment with rolls 8. Auxiliary rolls 8, 8' thus extend toward the fold lines of the blank as denoted by a—a or b—b as the case may be, and by their engagement with the blank at this region thereof prevent it from undergoing any angular displacement during the time when the adhesive is being deposited thereon.

Preferably disposed just beyond the deflector 7 is the glue applicator generally denoted 12, Fig. 6. It consists of a valve casing 15 having a valve stem 16 terminating in a valve proper 16a cooperating with a valve seat in the valve casing as shown. Valve casing 15 has a central bore 17 connecting with preferably a pair of jets 18, 18. The latter can be metal or composed of a tetrafluoroethylene resin plastic, manufactured by the Du Pont Company under the name of "Teflon" which has the property such that the adhesive used has little tendency to adhere to it; they have bores 18' such that their combined flow capacity is substantially equal to that of bore 17; thereby the tendency of the jets to drip after the flow is shut off is minimized.

As shown, the nozzles 18, 18 are contained in a unit 18a having bore 18b and flanged coupling 18c screw-threaded to casing 15.

The valve stem 16 has a screw thread 19 having threaded engagement with the casing 15 such that rotation of the stem 16 in the proper direction will either open or close the valve. The usual stuffing box 20 is provided for the valve stem and is threaded to the end of the casing 15. Liquid adhesive is admitted under pressure to the casing through pipe 21 connected to the valve casing by means of a union 22.

Means for actuating the valve are provided in the form of a solenoid 25, Figs. 1 and 3, having an armature 26 terminating in a rack 27 associated with which is intermediate gear 28 for right hand valve stem meshing with gear 29 connected to the valve stem 16. When the solenoid is deenergized, the valve will be closed by the action springs 30 which influence the position of the solenoid armature by acting on plate 30' attached thereto. A depending plate 30a forms with the opposite frame of the machine a guideway for the plate 30'. Thus when rack 27 is moved upwardly by solenoid 25 then, through intermediate gear 28, valve gear 29 rotates counterclockwise and opens valve.

Adhesive in liquid form is supplied to the pipe 21 under pressure through a flexible pipe 31 connected by means of nipples shown with a non-flexible pipe 32 having in circuit therewith a filter 33.

In the operation of the machine as thus far described, a box folded blank 100 is placed on the machine between adjustable guides 101 which support and guide the box blanks to the deflector 7 and associated glue applicator 12. Thereupon one flap of the blank will be engaged by and supported upon portion 7a of deflector 7 as shown in Fig. 3 and at a predetermined time the valve 12 will be opened to eject streams of adhesive through the jets 18 upon the opposite flap B of the moving blank 100. It further remains to describe the means for controlling the times in relation to the travel of the blank during which the flow of adhesive is on. The energizing of the solenoid 25 is brought about about by the advancing front edge of the box blank which closes normally open switch 40, Fig. 4. When, however, the advancing edge of the box blank reaches the normally closed switch 41, the circuit which was made by switch 40 is broken. Then when the box blank has completely passed over the first switch 40 the circuit remains broken until the arrival of the next box blank. Switches 40, 41, are carried on a rail 42 disposed longitudinally of the machine and are secured in adjusted position by means of set screws 43, Figs. 3 and 4. It will be apparent that the position of switch 40 will determine the point on the box blank at which the deposit of the adhesive is begun whereas the distance of the switch 41 from the switch 40 will determine the length of the adhesive stripes deposited. In this manner the adhesive will be deposited upon the box blank with the utmost accuracy as to length and location. By special circuits not shown, the second blank will start the cycle of adhesive deposition even though the first box blank is on the second switch. Only a small space between blanks is required to allow the first switch to operate. The set of conveyor rolls 1 is independently mounted from that of rolls 2 as will be evident from Fig. 1, such mounting being the same as in my specification previously referred to. As shown in Fig. 1, the upper conveyor is movable transversely of the machine by means of rollers 50 by means of which the conveyor is suspended on the cross channels 51, 52. The lower conveyor represented by rolls 2 is similarly suspended on the cross channels 53, 54, such lower conveyor being movable vertically toward and away from the upper conveyor in order to apply the requisite pressure upon the folded blank after the deposition of the adhesive, the mechanism for this having been disclosed in my previous application referred to.

Fig. 11 shows an alternative form of adhesive dispenser in which the armature 60 of the solenoid is integral with the valve 61 operating within a non magnetic casing 60a constituting an extension of the sealed line, and thus eliminating the need for a stuffing box. The armature 60 specifically, preferably of ample clearance, is provided with a central bore 62 and one or more milled grooves 63 in order to permit the armature chamber to be filled with adhesive and to permit a reasonably free circulation of the same through the chamber and easy movement of the armature. A spring 64 seats the valve when the solenoid is de-energized whereas energizing the solenoid opens the seated valve.

It will be apparent that as first described the adhesive may be deposited upon the so-called glue lap 6 of panel B, in which case the blank will be fed with the opposite body panel in raised position, the joint so formed being in accordance with Fig. 9; or the adhesive may be applied at 6' of panel A in which case the glue lap 6 at the opposite end of the folded blank will be fed into the machine resting on support 7a of Fig. 3, such joint being illustrated in Fig. 10.

Figs. 12–16 show a modification of the machine adapted to utilize adhesives of the water-resistant type by first depositing stripes of such adhesive on the abutting panel margins and then applying to the freshly gummed surfaces tape previously ungummed which has been measured to the proper length and cut. The means for feeding the blanks through the machine and the means for applying the gummed adhesive are essentially the same as in the embodiment already described. Also the tape feeding, cutting and applying means are essentially the same as disclosed in my earlier application above mentioned. As will be described in further detail, means are provided whereby the movement of the blank controls both the length and the fore and aft location of the adhesive stripe together with the length of the ungummed tape which is cut and applied in registry with the freshly gummed surfaces.

As seen in Fig. 12, the upper feed rolls 1 are modified so as to contain a peripheral groove 201a to span the adhesive stripes 70, 71, Fig. 14, deposited by glue applicator 212 disposed between adjacent rolls 1. Top rolls 1 following roll 89 do not have this groove as shown.

At a suitable distance further along the machine is located the tape measuring, cutting and applying mechanism C which may be comprised of a bell crank 75 whose pivot is shown at 76. At the upper extremity of the shorter arm is carried a separately driven feed roll 77. Beneath pivot 76 the shorter arm carries a knife 78. Serving as a mandrel for the knife is a roll 79. At the left hand extremity of the bell crank is spring 80 which will cause the bell crank arm when released to move downwardly and bring about the cutting action of the knife 78. To actuate bell crank 75 in the upward direction, a push rod 81 is provided having a slotted end in which is journaled a roller 82 in contact with the longer arm of the bell crank. Push rod 81 is upwardly movable by reason of the fact that its lower end portion constitutes the armature of the solenoid 83 such that when the solenoid is energized, the arm 75 is pushed upwardly so as to bring the feed roll 77 operatively against the ungummed tape now denoted 84 whereby the tape is seized between said roll and preferably driven backing roll 85, and payed out at substantially the same speed as the travel of the blank in the machine during such time as the solenoid is energized. When the circuit supplying current to the solenoid is broken, however, the spring 80 comes into play to release the tape 84 and to sever it by the action of the knife 78 against the mandrel 79. To aid in the feed of the strip of tape after it has been cut, the upper members of roll sets 86—88 are shown mounted in a floating frame 90 in order that the pressure of such upper roll members against the tape may be made adjustable by the action of springs 91 whose tension can be regulated by means of bolts 92.

The strip of tape having been measured out by the action of the feed rolls 77, 85 and cut by the knife 78, the same is fed downwardly by the action of the roll sets 86—88 into the bight of rolls 201b, 89, and thence between roll 201b and the box blank denoted 100. There it meets the freshly gummed stripes 70, 71, and is pressed against same by the action of opposed rolls 1, 2, and the remaining roll sets of the series so that when the blank emerges from the machine the tape is caused to be firmly adhered to the box blank.

It remains to describe the timing devices whereby the tape is cut to the proper length and deposited in registry with the specially gummed surfaces on the box blank. For the sake of clearness, the course of the blank 100 through the machine of Figs. 12–16 will be given even though the glue control circuits of this embodiment are the same as those previously described.

In its passage through the machine, the blank 100 first actuates normally open switch 240 (similar to switch 40), thereby actuating the solenoid 225 to open the valve of glue applicator 212, the circuit for same being indicated at D, Fig. 15. Switch 240, as will be seen from Fig. 16, is adjustably mounted on rail 242 and its position thereon will determine the instant at which the deposition of glue upon the box blank commences. The deposition will continue as the blank moves along until normally closed switch 241 is reached whereupon the circuit made by switch 240 is broken, causing the glue applicator to close by the action of the springs 230, 230. In order that a strip of tape of proper length may be prepared, the box blank contacts normally open switch 105 preferably mounted on a separate rail 106. Depending upon the position of the tape handling device and other factors, the switch 105 may be contacted either before, after or simultaneous with the contacting of switch 241 and the provision of rail 106 enables this relative location of the switches to occur. When switch 105 is thus closed, solenoid 83 is energized to initiate the feed of tape 84 and such feed will continue until the blank reaches normally closed switch 107 adjustably located on rail 106 whereupon the solenoid will be de-energized and the strip of tape will be cut off by the action of spring 80 and knife 78. As will be seen from Figs. 13 and 16, the switches 240, 241 and 105, 107 are held in adjusted position on their respective rails by set screws 243 in the case of switches 240 and 241, and by set screws 108 in connection with switches 105, 107.

In Fig. 13, the applicator 212 shown is the same as valve 12 shown earlier, having a pair (or one or more) of jets 18, 18, same being spaced laterally of the machine to deposit glue upon the margins of abutting panels 109, 110 as shown in Fig. 13. Where different widths of tape are to be employed, the jet holding unit 18a may be replaced by one in which the jets have the desired spacing or in which a greater or less number are employed, or plugs can replace nozzles as required.

If desired the glue applicator 212 may be moved forward so as to start to apply glue to the box blank at the instant the feed of the tape therefor is started. In such case a single switch will control both the start of the glue flow and the feed of the tape, and a single switch will control both the stopping of the glue deposit and the cutting of the tape. Where such an arrangement is employed, it will be desirable to provide for adjusting the position of the glue applicator fore and aft of the machine in order to take care of factors such as the reaction time of the tape feeding and cutting device which is a constant for a fixed spring tension of 80 while the rate of the feed of the blanks through the machine may be varied from time to time.

The liquid adhesive used normally will be placed under pressure of air or nitrogen, or other neutral gas, such pressure being of sufficient magnitude to give the desired qualities of flow for the viscosity obtained.

I have described what I believe to be the best embodiments of my invention. I do not wish, however, to be confined to the embodiments shown, but what I desire to cover by Letters Patent is set forth in the appended claims.

I claim:

1. In a machine for adhesively forming a manufacturer's joint in a folded carton blank, in combination, a conveying device having an upper and a lower run for continuously moving a folded carton blank through the machine with a panel component and a tabbed component, to be adhesively joined, disposed in predetermined, lapped relation, a liquid adhesive applying means located along the path of movement of said blank, means for engaging the lapped portion of the overlying component of said blank and retaining it and its adjacent panel portion in raised position as it approaches said adhesive applying means and positively retaining the same out of adhesive applying relation with said adhesive applying means as said blank passes said applying means, said adhesive applying means being disposed to enter generally in a lateral direction into the space between the plane of the engaging means and the plane of the lower run of the conveying means, said adhesive applying means including a downwardly directed nozzle for dispensing a flow of adhesive onto the upper surface of the lapped portion of the underlying component of said blank, means controlling the operation of said adhesive applying means to dispense adhesive over a predetermined portion of said underlying component, and means for thereafter pressing together the lapped components to join them adhesively.

2. In a machine as set forth in claim 1, said conveying device being constructed and arranged continuously to clamp together the folded parts of the blank at opposite sides of the line of movement under said nozzle, thereby positively to control and maintain the required relative disposition of the parts of the folded blank and the required orientation of the blank.

3. In a machine as set forth in claim 1, said upper and lower runs comprising two series of substantially contiguous upper rolls and two series of substantially contiguous lower rolls disposed in mutually opposed relation, there being an opposed series of upper and lower rolls at each side of the line of movement under said nozzle.

4. In a machine as set forth in claim 3, at least one of the upper rolls adjacent said nozzle being substantially spaced laterally from said line of movement under said nozzle.

References Cited in the file of this patent

UNITED STATES PATENTS

| | | |
|---|---|---|
| 1,067,867 | Dormandy | July 22, 1913 |
| 1,803,699 | Goss | May 5, 1931 |
| 2,130,932 | Sipe | Sept. 20, 1938 |
| 2,236,835 | Pope | Apr. 1, 1941 |
| 2,362,413 | Shields | Nov. 7, 1944 |
| 2,432,707 | Ardron | Dec. 16, 1947 |
| 2,609,306 | Pasotti | Sept. 2, 1952 |
| 2,633,063 | Ohrn | Mar. 31, 1953 |
| 2,691,260 | Schlemmer | Oct. 12, 1954 |